United States Patent [19]

Hunter

[11] 4,418,458
[45] Dec. 6, 1983

[54] APPARATUS FOR MAKING PIPE COUPLING JOINT

[76] Inventor: John J. Hunter, 1410 Willow Pond, Abilene, Tex.

[21] Appl. No.: 207,787

[22] Filed: Nov. 18, 1980

Related U.S. Application Data

[60] Division of Ser. No. 932,178, Aug. 9, 1978, Pat. No. 4,257,155, which is a continuation of Ser. No. 708,867, Jul. 26, 1976, abandoned.

[51] Int. Cl.³ ............................................. B23P 19/04
[52] U.S. Cl. ................................. 29/237; 29/243.52; 29/283.5
[58] Field of Search ..................... 285/382.2, 382.1; 29/237, 283.5, 234, 243.52

[56] References Cited

U.S. PATENT DOCUMENTS

| 3,717,920 | 2/1973 | Oliver et al. | 29/237 |
| 3,727,289 | 4/1973 | Beindmann et al. | 29/237 |
| 3,824,665 | 7/1974 | Saito | 29/237 |
| 3,848,451 | 11/1974 | Allin | 29/237 |
| 3,921,281 | 11/1975 | Hattori et al. | 29/237 |
| 4,057,882 | 11/1977 | Boeumer | 29/237 |
| 4,189,817 | 2/1980 | Moebius | 29/237 |

FOREIGN PATENT DOCUMENTS

| 2433946 | 7/1974 | Fed. Rep. of Germany | 29/237 |
| 621844 | 6/1976 | U.S.S.R. | 29/237 |

Primary Examiner—James L. Jones, Jr.
Attorney, Agent, or Firm—Kanz & Timmons

[57] ABSTRACT

Disclosed is a pipe coupling joint comprising an interference fit coupling of unthreaded pipe sections. The end of the outer pipe in a telescoped interference fit coupling is radially compressed to form a groove in the inner pipe. The crimped end is compressed into the groove to securely couple the pipe sections together. Lined pipe joints and methods and apparatus for forming the improved interference fit joint are also disclosed.

2 Claims, 6 Drawing Figures

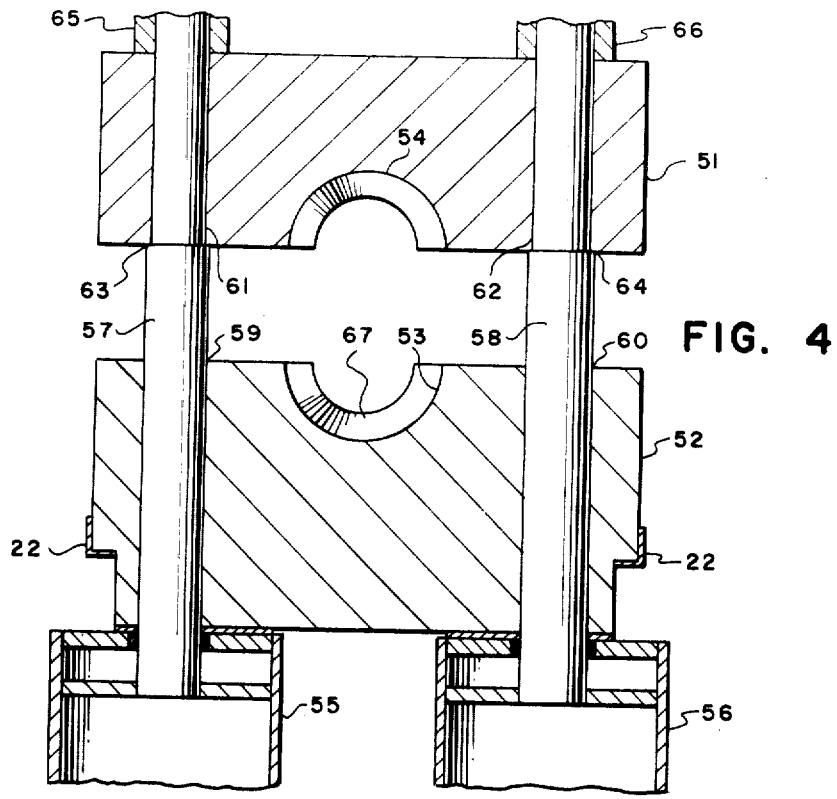
FIG. 4
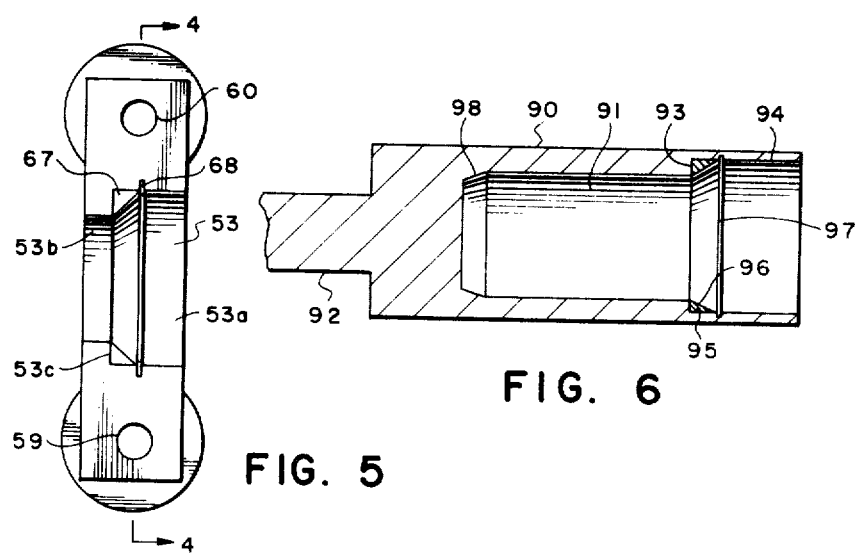
FIG. 5
FIG. 6

APPARATUS FOR MAKING PIPE COUPLING JOINT

This is a division of application Ser. No. 932,178 filed Aug. 9, 1978 entitled "Method of Making Pipe Coupling Joint" (now U.S. Pat. No. 4,257,155) which is a continuation of application Ser. No. 708,867 filed July 26, 1976 entitled "Pipe Coupling Joint and Method and Apparatus for Making Same ", now abandoned.

This invention relates to methods and apparatus for joining lengths of non-threaded metal pipe. More particularly, it relates to method and apparatus for interference fit joining of lengths of pipe to form a continuous conduit, and to the joint formed by such methods and apparatus.

Various methods have been used for joining lengths of pipe to form a continuous conduit. Perhaps the most common pipe joining method involves the joining of an externally threaded pin end of one pipe section with an internally threaded box end of another pipe section. The interconnection is generally called a joint and in the case of threaded ends is called a threaded joint.

While satisfactory for many purposes, threaded pipe joints are relatively expensive to prepare and considerable time is required to form a junction therebetween. For example, at least one length of pipe must be rotated to join threaded pipe, thereby rendering it difficult if not impossible to join two relatively long lengths of pipe with conventional threaded ends.

Other joining methods, such as welding, are commonly used to join pipe. However, in many applications it is necessary to provide the entire inner surface of a conduit with a protective liner. The internal surfaces are best protected with a liner of polyvinyl chloride bonded to the internal surface of the pipe as described in U.S. Pat. No. 3,758,361 to John J. Hunter. When the internal surface of the conduit is protected by such a liner, means must be provided for joining the ends of the liners at the junction of two pipe lengths so that the liner is continuous and the entire internal surface of the conduit formed is continuously lined. Because of the heat required in welding pipe ends together, welding cannot be commonly used to join lengths of lined pipe since the liner will melt and separate from the pipe walls when the pipe is welded.

For forming conduits in which the pressure of the fluid to be conducted through the pipe is relatively low, various types of non-threaded joints have been devised. Non-threaded joints are typically formed by enlarging the internal diameter of one end of the pipe section to a diameter slightly less than the external diameter of the pipe. The enlargement is usually formed by forcing a mandrel of the desired dimensions into one end of the pipe and thereby enlarging or swelling the end of the pipe. The enlarged end is commonly referred to as a bell and the end of the adjoining pipe which fits within the bell is commonly referred to as the pin end or spigot. Conventionally, the bell is formed by forcing a mandrel of desired shape into one end of the pipe to form a bell of enlarged dimensions with a flared end so that the pin end may be inserted into the flared portion and forced into the remaining portion of the bell. Such joints are commonly referred to as interference fit joints and are commonly used in applications wherein the pressure of the fluid passing through the conduit is relatively low, such as, for example, in automobile exhaust pipes and the like. Since the internal diameter of the bell is less than the external diameter of the pin, the bell must be slightly expanded radially as the pin is axially inserted therein. The difference in diameters is conventionally known as the interference and the friction between the walls interference fitted together forms the joint or coupling force. Since the external diameter of the pin is greater than the internal diameter of the box, the box is expanded radially as the pin is inserted therein. Obviously, the pin and box must have substantially non-tapered cylindrical dimensions. Otherwise, the entire bell would be expanded radially simultaneously rather than expanded progressively as the pin is inserted axially therein. Therefore, as used herein, the term "substantially parallel inner walls over a major portion of the axial length thereof" is used to define a bell which has substantially cylindrical dimensions as contrasted to tapered dimensions. Likewise, the term "substantially axial parallel external walls" is used herein to define a pin which has substantially cylindrical dimensions as contrasted to tapered dimensions.

One of the main advantages of interference fit joints is that they may be formed relatively quickly and inexpensively and neither pipe section need be rotated to form the junction. Furthermore, since excessive heat is not required to form an interference fit joint, plastic lined joints may be formed with appropriately designed ends on the plastic liner. Among the disadvantages of conventional interference fit joints is that the joint is usually incapable of withstanding high pressures and will either leak or separate if the conduit is subjected to high internal pressures.

U.S. Pat. No. 3,208,136 to Joslin discloses a modification of the conventional interference fit joint. In the method disclosed in U.S. Pat. No. 3,208,136 an annular groove is formed in the pin end of the pipe. The pin end is telescoped within the bell with such force that the pin end buckles in the region of the annular groove when the pin end strikes the shoulder of the bell. As the pin end buckles the portion of the inner pipe adjacent the groove is forced outwardly against the inside wall of the bell to deform the bell and form corresponding grooves in the bell. In this manner interlocking grooves are formed between the pin end and the bell end which, when properly formed, form a leak-proof joint of substantial rigidity which is capable of withstanding high internal pressures. One of the major disadvantages, however, of the buckle joint formed according to the Joslin patent is that the method may only be satisfactorily used with relatively thin walled pipe or soft pipe such as aluminum. When thicker walled pipe is used, the buckle fails to form corresponding grooves in the bell and the joint formed thereby is not satisfactorily mechanically coupled. Therefore, when subjected to high internal pressure, the joint tends to separate.

In accordance with the present invention, methods and apparatus are provided for forming a rigid joint between either thick or thin walled non-threaded steel pipe. The joints are formed by forming a bell in one pipe end as in conventional interference fit joining methods. The pin end is then forced into the bell and thereafter the end of the bell is radially compressed sufficiently to form a groove in the pin end so that the end of the bell fits within the groove formed. In this manner the pipe joints are mechanically locked. The compressed or crimped end may be formed after the interference joint is formed or contemporaneously therewith and the junction formed thereby is capable of handling extremely high internal pressures without separation or leakage. Furthermore, since the internal surfaces of the joined pipe are substantially unaffected by the joining method, continuously lined pipe conduits can be readily formed. Other features and advantages of the invention will become more readily understood when taken in conjunction with the appended claims and attached drawings, in which:

FIG. 4 is a sectional view of the crimping head illustrated in FIG. 3;

FIG. 5 is a top plan view of the bottom yoke of the crimping head; and

FIG. 6 is a sectional view of an end sizing apparatus for preparing the pin end of pipe section to be formed in accordance with the invention.

Since one of the major advantages of the pipe joining method of the invention is the ability to form junctions between lined pipe joints and therefore form a continuously lined conduit, the invention will be described with particular reference to joining lined pipe. It should be understood, however, that the invention is not so limited. The principles of the invention apply equally to unlined pipe and lined pipe.

In conventional pipe joining methods, a pipe section of finite length is joined with another pipe section of finite length and the process repeated to form a continuous conduit. Conventionally, one end of the pipe is formed to receive the end of the adjacent pipe section. Therefore, each pipe section is ordinarily prepared to have a bell or box on one end and a pin end on the opposite end. Ordinarily only one end of the pipe is enlarged to form a bell. The opposite end of the pipe is usually used as the pin end in its unenlarged or unchanged state. If desired, however, the pin end may have reduced dimensions. The ends of adjacent pipe sections to be joined in accordance with the preferred method on the invention are illustrated in FIG. 1.

Figure 1:
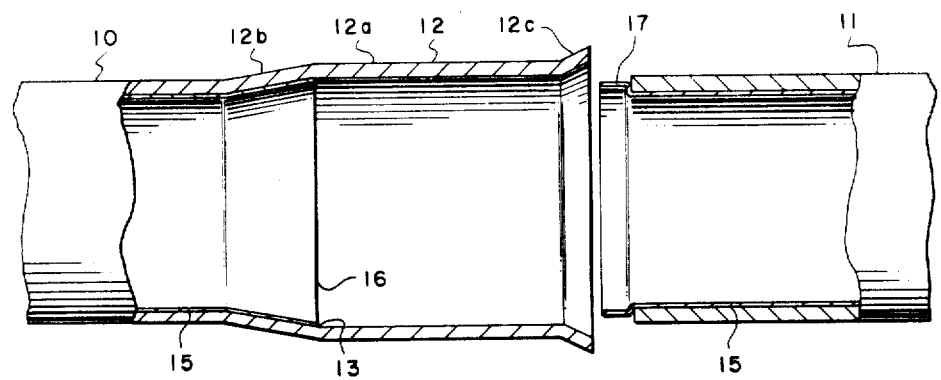
FIG. 1 is a sectional view of the box end and pin end of line pipe immediately prior to joining thereof in accordance with the invention.

The pipe sections 10 and 11 illustrated in FIG. 1 may be any conventional metal pipe. One end of pipe 10 is enlarged to form a bell 12. The enlarged bell 12 is formed by conventional means such as forcing a mandrel into the end of the pipe to swell or enlarge the end of pipe 10 to the desired dimensions. Conventionally, the bell 12 will be comprised of three sections; an enlarged section 12a in which the internal walls of the bell are substantially parallel (thus having a substantially uniform diameter), a neck or shoulder portion 12b (the section of pipe joining the enlarged section 12a with the remainder of the pipe 10), and a flared portion 12c at the mouth of the bell. It will be readily understood that the neck 12b simply interconnects the bell with the pipe section and thus forms a shoulder 13 at the base of the bell. Since the internal diameter of the bell 12 is ordinarily slightly less than the external diameter of the pin end of section 11, a flared portion 12c is formed at the end of the bell simply to accommodate ease of inserting the pin end 11 within the bell 12. The flared portion 12c, therefore, is not essential. In the preferred embodiment of the invention the sides or walls of the bell 12 are substantially parallel and the pin end of the pipe has the same dimensions as the remainder of the pipe body.

The pipe sections illustrated in FIG. 1 may be joined in conventional manner with an interference fit joint by telescoping the pin end of pipe 11 within the bell 12. Since the internal diameter of the bell 12 is slightly less than the external diameter of the pin end of pipe 11, substantial force is required to telescope the pin within the bell. Thus the bell may be slightly further radially enlarged upon insertion of the pin end axially therein. Because of frictional forces between the engaged sides of the bell and the pin end, a relatively good seal is formed between the bell and pin, thus forming a sealed conduit. This method of forming an interference fit joint is conventional and, with the exception of the end crimping, sealing and internal liner (to be described hereinafter), is known in the art.

Figure 2:
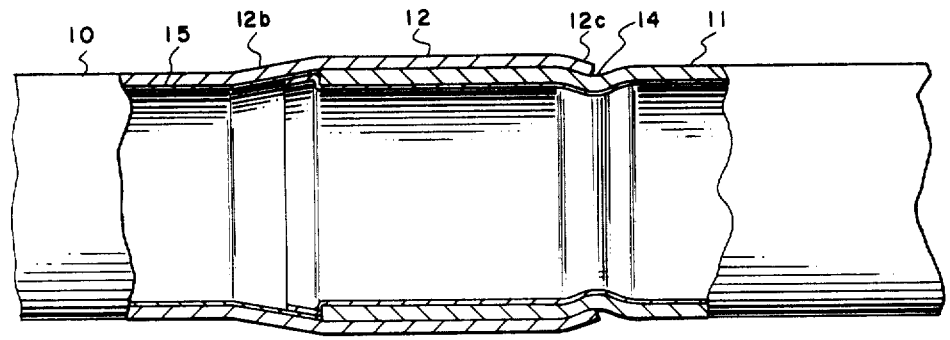
FIG. 2 is a sectional view of the junction formed between the pipe ends illustrated in FIG. 1 in accordance with the invention.

In accordance with the invention, the end of the bell 12 (substantially corresponding with the flared portion 12c) is radially compressed after the junction is formed or simultaneously therewith. The end is compressed or crimped sufficiently to form a groove 14 in the pipe 11 after the pin end of pipe 11 has been inserted within the bell as illustrated in FIG. 2. By crimping the flared end 12c into the pipe 11, a mechanical lock is formed, thereby interlocking the pipe sections together. Joints formed as described are found in most cases to have greater mechanical strength than the remainder of the pipe body, and when conduits formed using the joint described are subjected to high internal pressures, the pipe wall will rupture before the joint will break.

The joint described hereinabove may be formed using any substantially rigid conduit having malleable characteristics, such as steel pipe, aluminum pipe or pipe made of other metal alloys. Furthermore, the wall thickness of the pipe is not critical since the end crimping can be performed on thick walled steel pipe as well as thin walled softer conduit.

The axial length of the bell, which determines the axial length of interference fit between the two pipe sections, may vary according to the characteristics of the pipe and the use for which the conduit is intended. As a typical example using steel pipe of 3.5 inches in diameter with a wall thickness of 0.237 inch, the bell is about 5¾ inches long. The internal diameter of the bell end is enlarged so that the internal diameter of the bell is approximately 0.040 inch less than the external diameter of the pin end. This difference in diameters is commonly referred to as the interference fit. As is commonly known, the amount of interference fit may vary depending on wall thickness of the pipe, the material of the pipe, the amount of pressure to be used on the fluid flowing through the pipe and the length of the bell. An interference fit of 0.030 to 0.050 inch has been found satisfactory for common steel and aluminum pipe. It has been discovered, however, that the external diameter of some pipe, particularly thick walled steel pipe, may vary substantially from manufacturer to manufacturer. Furthermore, the pipe may not be perfectly circular in cross-section. Accordingly, when a standard sized mandrel is used to form the bell, the external diameter of the pin end may be substantially larger than the internal diameter of the bell. Therefore, the interference may be larger than desired. When the interference is larger than about 0.060 inch, severe galling may occur upon insertion of the pin end within the bell. To prevent galling and assure uniform mating of the pin end within the bell, it is often desirable to size the pin end prior to completion of the joint. Sizing may be readily accomplished by forcing a sleeve or ring having internal dimensions of the desired external dimensions of the pin over the pin end of the pipe, thereby slightly compressing the pin end of the pipe to approximately the desired interference fit size.

Sizing of the pin end assures uniform interference fit between the pin and the bell and also assures that mill scale and the like formed on the external surface of the pipe will be removed prior to completion of the joint. This assures a more uniform joint and a better seal between the external surface of the pin and the internal surface of the bell. More importantly, sizing of the pin end prevents galling of the bell during the insertion operation, therefore assuring a uniformly sealed joint.

Apparatus for sizing the pin end in accordance with the invention is illustrated in section in FIG. 6. The sizing apparatus comprises a cylindrical sleeve 90 with a cylindrical cavity 91 having internal dimensions which correspond to the desired external dimensions of the pin end. The sleeve 90 has a pedestal shaft 92 extending from the closed base thereof. The pedestal 92 is placed in a pipe press and the end of the pipe to be sized is placed co-axially aligned with the open end of the sleeve 90. The open end of the sleeve is internally enlarged to form an annular cavity 94 which is greater than the external dimensions of the pipe. An annular shoulder 93 is thus formed within the cavity 91. A hardened steel ring 95 having tapered inner surface 96 is held adjacent the shoulder 93 by retainer ring 97. The internal surface of ring 95 tapers from the diameter of annular cavity 94 to the diameter of cavity 91.

The pin end of the pipe section is forced into the cavity 91. Any portion of the pin end larger than the internal diameter of the ring 95 strikes the tapered surface 96 and thus is compressed to the desired dimensions by being forced through the sizing ring 95. In this manner oval or eccentric shaped pipe is made circular in cross section and any pipe with oversize external dimensions is sized to standard dimensions. Similarly, the external dimensions of the pin end may be reduced to any desired dimensions. In the embodiment illustrated, in the sides of cavity 91 are parallel except for a small tapered region 98 at the base thereof. The tapered region 98 forms a slight taper on the end of the pipe to insure that the end of the pin does not scrape the walls of the bell as the joint is formed.

When sizing the ends of pipe sections it is desirable that the pipe be lubricated. Any lubrication, such as grease or the like, may be used to prevent the pipe from welding to the sizing sleeve. Accordingly, the sleeve may then be withdrawn and the pipe is ready for use.

Sizing the pipe as described above not only assures uniform interference fit between the bell and pin, but also cleans the pin end so that maximum interference engagement will occur when the joint is formed and any pipe sealant to be used will firmly adhere to the pipe.

Compressing the end of the bell to form the crimped interlock as described above may be performed by various methods. Any apparatus which deforms a portion of the bell into a corresponding groove in the pin end formed by compressing the bell may be used. In the preferred embodiment uniform radial compression is accomplished by partially forcing a crimping collar axially over the end of the bell after the interference fit joint is formed. The collar has an internal diameter which is divergent from a diameter of slightly more than the external diameter of the pipe 11 to an internal diameter greater than the external diameter of the flared portion 12c of the bell. The flared collar is placed over the pipe 11 with its internal diameter expanding in the direction of the pin end of the pipe. After the interference fit joint has been formed, the collar is moved axially over the pipe 11 to engage the flared end 12c of the bell. Since the collar is flared and completely surrounds the pipe 11, the end 12c of the bell is uniformly radially compressed and forced into the pipe to form groove 14. The end 12c is thus permanently deformed and fitted into the groove 14 to form an interlocking joint as illustrated in FIG. 2.

Fully lined conduit may be formed as illustrated in FIGS. 1 and 2 using the pipe joining method of the invention. To form a fully lined joint a liner is positioned within the pipe sections 10 and 11. The liner may be any suitable conventional liner but is preferably a polyvinylchloride liner bonded to the internal surface of the pipe 10 and 11 as described in U.S. Pat. No. 3,758,361. The polyvinylchloride (PVC) liner is bonded to the internal surface of the pipe 10 after the bell has been formed therein. The end 16 of PVC liner 15 is expanded to conform to the internal dimensions of the flared neck portion 12b of the pipe. The end 16 extends into the flared neck 12b but not past shoulder 13 as illustrated in FIG. 1. The end 17 of liner 15 extends past the open end of the pin end of pipe 11. The end 17 extending from the pin end of pipe 11 is slightly expanded so that the external dimension thereof is less than the external dimension of pin end 11 but greater than the internal dimension of pin end 11 as illustrated in FIG. 1. In this manner the end portion 17 of liner 15 extending past the end of pin end 11 will fit within the end 16 of liner 15 in the throat of the bell when the pin end of pipe 11 meets the shoulder 13 in the bell.

To form a seal between the overlapped portions of the plastic liner the external surface of end portion 17 extending from pin end 11 is coated with a suitable adhesive, solvent, cement or the like immediately prior to insertion of the pin end within the bell.

In the preferred embodiment of the invention a conventional PVC joint cement is applied to the external surface of the end portion 17 in sufficient amounts to fully cover the external surface of the end portion 17 extending from the pin end so that the end porton 17 will be uniformly bonded to the internal surface of the end portion 16 within the throat of the bell when the joint is completed. Accordingly, a continuous liner is formed on the internal surface of the joint as well as the internal surface of the pipes when the joint is completed.

In forming conventional interference fit joints a lubricating agent is sometimes applied to the pin end of the pipe to aid in inserting the pin end within the bell. When a conventional lubricating agent is used, care must be taken to avoid mixing the lubricating agent with the PVC cement or other bonding agent used unless the cement is also to be used as a lubricating agent. Where a lubricating agent is used which will interfere with the formation of a bond between the ends of the PVC liner, care should be taken to avoid mixing of the lubricating agent with the bonding agent.

In the preferred embodiment of the present invention an epoxy resin is used as a lubricating agent and also to aid in forming a metal-to-metal bond between the bell and pin ends of the pipe. Any suitable conventional bonding agent may be used. A two part epoxy resin bonding agent for forming metal-to-metal seals has been found particularly suitable. The preferred epoxy resin is a metal bonding agent sold under the name Steel Seam by Cooks Paint & Varnish Company of Kansas City, Missouri. This bonding agent is a two part epoxy agent comprising a curing agent (sold under the trade designation 920L927) which is mixed with a base (sold under the trade designation 920W979). The curing agent and base are mixed immediately prior to use and applied to the external surface of the pin end of the pipe immediately prior to insertion of the pin within the bell. Care should be taken to avoid mixing the metal-to-metal bonding agent with the PVC cement. The lubricating-/bonding agent is applied only to the pin end. If the lubricating agent is placed within the bell prior to insertion of the pin end, the PVC cement may be mixed with the lubricating agent and/or the lubricating agent may become trapped between the end of the pin and the shoulder. The trapped fluid will be forced out between the overlapping ends of the plastic liners as the pin end approaches the shoulder 13. Therefore undesirable contamination of the PVC bonding agent will occur. Furthermore, the overlapped portions of the PVC liner will be separated and not seal properly.

It has been found, however, that the particular two part epoxy described above may be used for both bonding the PVC liners as well as the metal joint. While the plastic-to-plastic seal achieved is not of the quality achieved with PVC cement, it has been found suitable in most applications. Therefore a single application of this epoxy may serve as the lubricating agent, the metal-to-metal bonding agent, and the plastic-to-plastic bonding agent and the problems of contamination totally eliminated.

Figure 3:
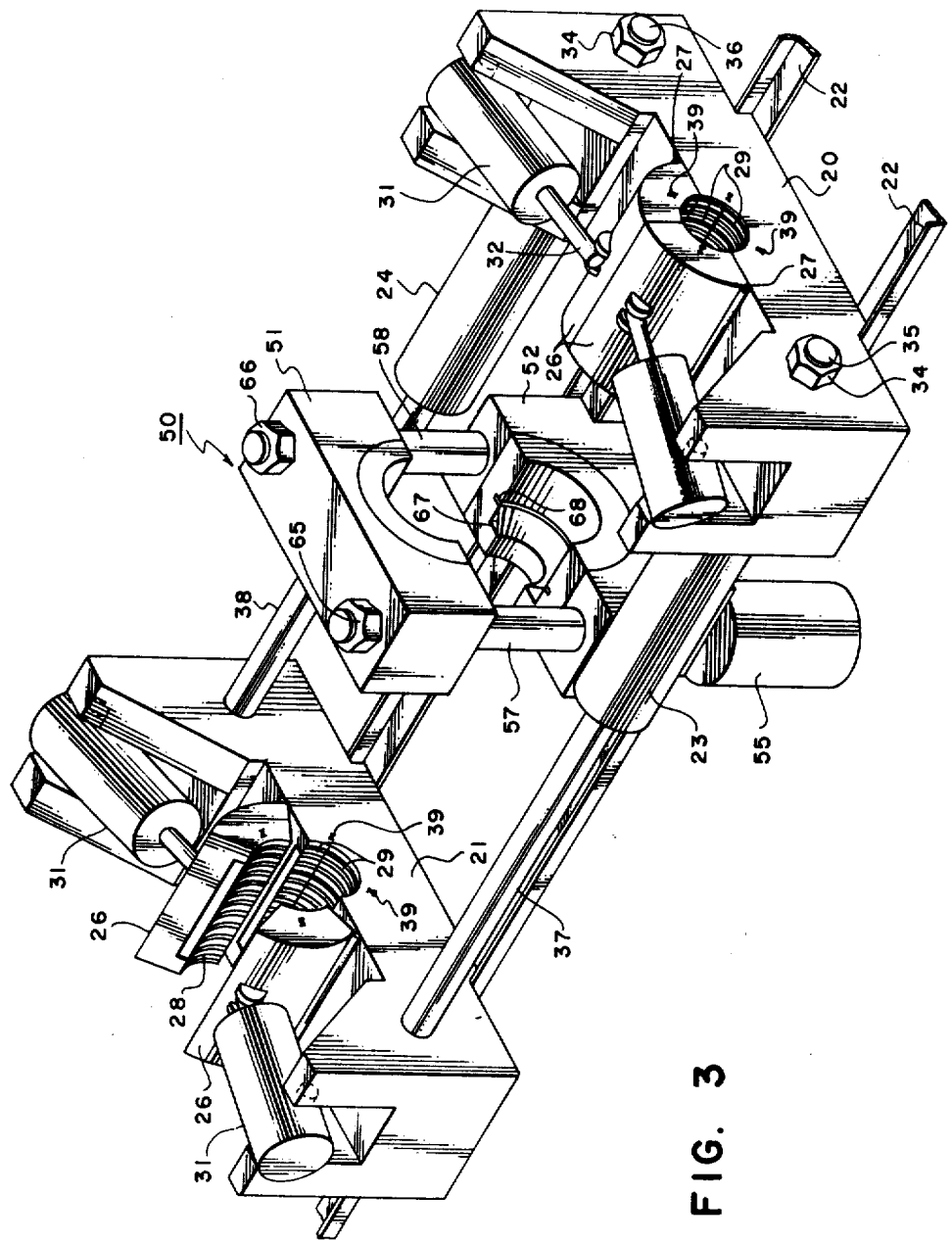
FIG. 3 is a perspective view of apparatus for forming a pipe joint as illustrated in FIG. 2.

Apparatus for forming a pipe joint in accordance with the invention is illustrated in FIG. 3. In the preferred embodiment the apparatus comprises a pair of press heads 20 and 21 adapted for reciprocal movement with respect to each other and powered by suitable hydraulics. In the embodiment illustrated the apparatus comprises a stationary head 20 mounted on suitable supporting framework 22. The stationary head 20 comprises an elongated yoke with a pair of hydraulic cylinders 23 and 24 rigidly affixed at the opposite ends of one side thereof. Hydraulic cylinders 23 and 24 are mounted to extend in a plane horizontal to the yoke and are parallel. A slip receiving bowl is centrally formed in the head 20 with its axis transverse to the yoke and parallel with the central axes of cylinders 23 and 24. A pair of doors 26 are mounted on head 20 by means of hinges 27. Each door 26 carries a pair of slip sections 28 which cooperate with slip section 29 in the bowl in the yoke. Upper slip section 28 and lower slip section 29 are removably mounted in the bowls by conventional means such as dovetail keys 39 and form corresponding conventional slips to engage a pipe section positioned therein parallel with the cylinders 23 and 24. Slip sections 28 and 29 are conventional parallel slips removably mounted within the bowls and are adapted to be interchangeable so that slips of various internal diameters may be used as desired to accommodate various pipe sizes.

Door closing hydraulic cylinders 31 are pivotally mounted on the yoke (as illustrated in phantom in FIG. 3) with the piston rods 32 connected to doors 26. Door cylinders 31 are double acting cylinders, thus may be used to open and close the doors 26 as well as apply pressure to the slips to grip the pipe.

As noted above, hydraulic cylinders 23 and 24 are rigidly attached to head 20 by means of mounting shafts 35 and 36 extending axially from the base of the cylinders through the head 20 and secured by nuts 34. Similarly, the ends of piston rods 37 and 38 extending from cylinders 23 and 24, respectively, are rigidly attached to the ends of traveling head 21. Cylinders 23 and 24 are double acting cylinders of the same size and are simultaneously activated. Accordingly, traveling head 21 is not attached to frame 22 but may ride thereon if desired. In all other respects traveling head 21 is essentially identical to stationary head 20. By rigidly affixing the cylinders 23 and 24 to stationary head 20 and the ends of piston rods 37 and 38 to the traveling head 21, the central axis of the slips in the stationary head is permanently aligned with the central axis of the slips in traveling head 21. Therefore, misalignment of the pipe sections is avoided. Unless the pipe sections 10 and 11 are substantially axially aligned and maintained in alignment during the joining operation, the pin end may unduly scrape one side of the bell and cause galling when the joint is formed. Therefore, it is desirable that the traveling head 21 be securely and rigidly affixed to and supported by the piston rods 37 and 38. Additional pipe supporting means (not shown) may be positioned at either end of the apparatus to assure proper alignment of the pipe sections during assembly.

In the apparatus illustrated in FIG. 3, means for radially compressing the mouth of the bell is illustrated at 50. The radial compression head 50, generally referred to herein as the crimping head, is shown in detail in FIGS. 4 and 5. In the preferred embodiment the crimping head 50 comprises a pair of vertically opposed yokes 51 and 52 positioned between the stationary head 20 and the traveling head 21. The bottom yoke 52 has a semi-cylindrical bowl 53 centrally disposed in the top surface thereof. Top yoke 51 has a corresponding semi-cylindrical bowl 54 in the bottom surface thereof. Bowls 53 and 54 form a cylinder with its central axis aligned with the central axis of the slips in the stationary head 20 and the traveling head 21 and carry mating semi-cylindrical members which form a crimping collar.

The lower yoke 52 rides freely within frame 22 as illustrated in FIG. 4. Crimping cylinders 55 and 56 are mounted on the lower surface of bottom yoke 52.

The piston rods 57 and 58 extending from cylinders 55 and 56, respectively, pass vertically through vertical holes 59 and 60 in the lower yoke 52. Rods 57 and 58 also extend vertically through holes 61 and 62, respectively, in the upper yoke 51. As shown in FIG. 4, the holes 61 and 62 in the upper yoke 51 are of smaller diameter than holes 59 and 60 in the lower yoke and the portion of rods 61 and 62 extending through the upper yoke 51 are of reduced diameter to correspond to the size of the holes 61 and 62 in the upper yoke. Accordingly, the bottom surface of upper yoke 51 rides on shoulders 63 and 64 of rods 57 and 58, respectively, and the upper yoke 51 is securely fastened to the rods by suitable means such as nuts 65 and 66. It will thus be observed that since the cylinders 55 and 56 are attached to the lower yoke 52 and the piston rods 57 and 58 are attached to the upper yoke 51, simultaneously supplying fluid to the upper end of cylinders 55 and 56 draws yokes 51 and 52 together like a guillotine. Similarly, simultaneously supplying hydraulic fluid to the lower ends of cylinders 55 and 56 opens the yokes 51 and 52.

As illustrated in FIG. 4, hydraulic cylinders 55 and 56 extend laterally from the ends of yoke 52. Bottom yoke 52 rides within the frame members 22 and extends below the frame members 22 a distance of about an inch or more. Accordingly, the entire crimping head assembly may move vertically within the framework 22 the distance between the frame 22 and the cylinders 55 and 56. In this manner the crimping head 50 floats freely within the frame and when the head is open (as illustrated in FIG. 4) the lower yoke 52 moves down from the central axis of pipe extending through the apparatus, thereby disengaging both the upper yoke and the lower yoke from the pipe. Accordingly, pipe may be drawn horizontally through the apparatus without engaging either the upper or the lower yoke and the apparatus may be operated to join pipe without interference by the crimping head.

The preferred embodiment of the crimping collar is illustrated in detail in the top plan view of lower yoke 51 illustrated in FIG. 5.

As illustrated in FIG. 5 the semi-cylindrical bowl 53 is of stepped or graduated diameter. Therefore the bowl has a larger diameter portion 53a on one side and a smaller diameter 53b on the opposite side forming a shoulder 53c within the yoke 52.

The diameter of the larger bowl 53a is larger than the diameter of the mouth of the bell on the pipe to be joined. The smaller diameter 63b must be at least as large as the diameter of the body of the pipe 11 adjacent the pin end.

A crimping ring is formed by a pair of mating semi-circular members, one in the upper yoke and one in the lower yoke 52. The semi-circular members 67 fit within the larger bowl 53 as illustrated in FIG. 5. The back of the crimping ring 67 abuts shoulder 53c and the ring is held in place by a retaining ring 68. The internal diameter of the crimping ring 67 is tapered from a diameter slightly larger than the diameter of the mouth of the bell to a diameter slightly larger than the diameter of the body of the pipe 11 adjacent the pin end. As illustrated in FIG. 4, the smaller diameter portion of the crimping ring 67 abuts shoulder 53c.

An identical matching crimping ring is mounted within bowl 54 in the upper yoke 51. It will thus be observed that when the crimping head is closed the semi-circular members within the bowls form a tapered collar of divergent diameter diverging from a diameter slightly larger than the body of the pipe 11 to a diameter larger than the largest portion of the bell.

Operation of the apparatus of FIGS. 3, 4 and 5 to produce the joint of the invention is apparent from the drawings. A first pipe section is positioned within the stationary head 20 and the slip doors 26 closed, thus gripping the body of pipe 10 relatively close to the neck 12b of bell 12. A section of pipe 11 to be joined thereto is positioned within the traveling head 21 and the slip doors closed to grip the pipe 11 in the slips of the traveling head. Crimp head 50 is positioned adjacent the traveling head 21 and maintained in the open condition. Thus, the pin end of pipe 11 extends through the open crimp head.

Cylinders 23 and 24 are activated to draw traveling head 21 toward stationary head 20. Since the pipe sections are axially aligned the pin end of pipe 11 is telescopically forced within the bell 12 progressively expanding the bell radially as the end of the pin moves axially through the bell until the pin end strikes shoulder 13. At this point the slips on the traveling head are released and crimping head 50 is simultaneously closed. When the slips in the traveling head are released, traveling head 21 moves axially over pipe 11 and continues to travel toward the bell, thus driving the crimping head over the bell. When the end of the bell strikes the crimping collar 67 within crimping head 50, the flared portion 12c of the bell is uniformly radially compressed. As the crimping head 50 continues over the end of the bell, the flared portion 12c is radially compressed inwardly until a groove 14 is formed in the pin end by inward radial compression of the end portion 12c.

Since the crimping head 50 is free floating within the frame 22, only the crimping ring 67 contacts the bell. Thereby the crimping head is free to move to be axially centered over the bell and uniformly compresses the mouth of the bell from 360°.

After the end has been crimped to the extent desired, the cylinders 23 and 24 are reversed and the traveling head 21 returned to the first position. Crimping head 50 is then opened. When the head is opened the lower yoke 52 drops away from the pipe and the upper yoke 51 is raised away from the pipe so that the completed joint may be drawn through the apparatus. The slips on the stationary head are then opened and the completed joint drawn through the apparatus. Alternatively, the apparatus may be moved to the next pipe joining position by drawing the apparatus over the pipe.

If desired, the crimping head 50 can be closed before completion of the interference fit joint. When the crimping head is closed before the joint is formed, the crimping head 50 travels with the traveling head 21 and slides over pipe 11 until the bell is contacted by the crimping ring 67. The flared portion 12c of the bell is then automatically and simultaneously crimped at the end of the insertion stroke. To operate the crimping head in this manner, the stroke of the traveling head must be predetermined so that the crimping ring 67 is in the proper position to form the crimp at the end of the insertion stroke.

In the operation described hereinabove, the crimp is formed by axially drawing the crimp head 50 over the bell while the crimping ring is in a closed position. If desired, the end of the bell may be crimped with the head illustrated by positioning the crimping ring 67 over the mouth of the bell and then closing the crimping head. The crimp is thus formed by the opposing vertical movement of the yokes 51 and 52 while the crimping head is not moving in the axial direction. When operated in this manner the radial compression force is applied primarily to the top and bottom of the mouth (by the opposing action of the yokes 51 and 52) rather than uniformly from 360° as occurs when the ring 67 is drawn over the mouth of the bell. However, this mode of operation may be used to crimp interference fit joints previously formed or formed by other means or apparatus.

When the crimping head 50 is moved axially as described above the apparatus uniformly radially compresses the mouth 12c of the bell into the pin end of pipe 11 as illustrated in FIG. 2 to form a groove 14 with the entire circumference of the mouth 12c nested in the groove. In this manner the pipe sections are mechanically locked together and cannot be pulled apart without deforming mouth 12c.

Best results are obtained when the mouth 12c of the bell is radially compressed by forcing tapered ring 67 axially over the end thereof at the end of the insertion stroke as described hereinabove, thereby forming a crimp for the full 360° around the mouth and forming a full 360° groove 14 in the pin end 11. The head 50 illustrated best performs this function since it is free floating within the frame 20 and allows the crimping ring 67 to automatically center around the axis of the pipe. If desired, however, a crimping ring may be mounted on either the traveling head or the stationary head as desired. However, the crimping ring should be driven by the head which carries the pin end of the pipe so that axial pressure is applied against the bell while the pipe section carrying the bell is held by the other head. Obviously, if the bell end of the pipe is not firmly held when the crimping head is driven thereover, the crimping head may drive the bell off of the pin rather than crimp the mouth of the bell.

Since the crimp head 50 illustrated is free floating, it may be reversed to allow either the traveling head or the stationary head to hold the bell end during the assembly and crimping operation. Alternatively, crimping rings may be attached to the inner faces of both the traveling head and the stationary head and thus permit operation in alternative directions.

While the invention has been particularly described with reference to forming an enlarged bell in one end of a pipe section and inserting the pin end of an adjoining pipe section within the bell, it will be readily apparent that the principles of the invention may be used to join pipe ends of equal diameter by bridging the joint with an elongated collar of larger external diameter. In this method of operation the one pipe section is gripped by either the stationary head or traveling head as described above and an elongated collar of larger external diameter (having an internal diameter approximately 0.030 to about 0.060 inch smaller than the external diameter of the pipe) held by the other head. The collar is driven onto the pipe end and the mouth of the collar crimped as described hereinabove. The end of the collar to which the pipe is attached is then held in one of the press heads and the end of another pipe forced within the opposite end of the collar and crimped. In this manner the ends of the pipe need not be treated (except for sizing) and the elongated collar performs the function of a bell on both pipe sections.

In the embodiment illustrated, the mouth of the bell is radially compressed to form a groove in the pin end of the pipe for a full 360°. It will be readily recognized, however, that a full 360° crimp is not necessarily required. Any portion of the bell may be crimped to interlock the pipe sections without departing from the principles of the invention. When less than a full 360° crimp is used, however, the degree of mechanical interlock will be proportionately reduced.

While the invention has been particularly described with reference to crimping the mouth of the bell by forcing a crimping ring thereover, it will be readily appreciated that other means may be used for applying radial compression to the mouth or other portion of the bell. For example, a circumferentially rotating inwardly compressing roller may be used to roll the mouth of the bell into the pin end to accomplish similar results. However, rolling the mouth of the bell to form the crimp does not apply uniform radial compression to the mouth and thus may not form as uniform a crimping and sealing operation. However, use of a circumferential radial compressing roller permits deformation of the bell at locations other than the mouth thereof. For example, the circumferential radial roller may be used to form one or more annular grooves or sections of annular grooves at various locations along the length of the bell to form similar mechanical interlocks.

As described above, the interference fit joint formed in accordance with the invention forms a uniform seal between the pin and bell as the pin is inserted within the bell and expands the bell. As indicated above, in the preferred embodiment of the present invention a metal-to-metal epoxy resin is used as a lubricant to prevent welding or galling of the parts and to fill any scratches formed during insertion. The epoxy resin fills any scratches formed and forms a complete metal-to-metal bond between the mating pipe ends, thus assuring a complete gas-tight seal while aiding in holding the joint together.

Apparatus as described herein may be used to join malleable pipe of any size and wall thickness, depending only upon the size and hydraulic capabilities of the apparatus designed. It should be noted that the apparatus is of extremely simple design and may be operated either in the horizontal position (as illustrated) or in the vertical position. Where required, the apparatus may even be inverted and lowered into a trench to make repairs.

For repetitive joining of pipe sections to form a continuous conduit, the apparatus may be suspended from any convenient carrier by framework 22 and carried to each pipe joining station while the completed conduit is drawn through the open slips.

It is to be understood that although the invention has been described with particular references to specific embodiments thereof, the forms of the invention shown and described in detail are to be taken as preferred embodiments of same, and that various changes and modifications may be resorted to without departing from the spirit and scope of the invention as defined by the appended claims.

What is claimed is:

1. Apparatus for interference fit joining rigid malleable pipe sections comprising:
   (a) means for holding a second pipe section in axial alignment with a first pipe section;
   (b) means for holding said first pipe section in axial alignment with said second pipe section and simultaneously axially telescoping the end of said first pipe section within the end of said second pipe section; and
   (c) means for deforming the mouth portion of said second pipe section radially inwardly to form an annular groove in said first pipe section and fit said mouth portion of said second pipe section within said annular groove, said means for deforming including:
      (i) first and second semi-circular members adapted to form a circular ring when positioned adjacent each other, said circular ring having a substantially smooth inner surface tapered from an internal diameter as large as the external diameter of said first pipe section to an internal diameter larger than the external diameter of the mouth of said second pipe section;
      (ii) means for positioning said first and second semi-circular members adjacent each other and surrounding said first pipe section adjacent the mouth of said second pipe section; and
      (iii) means for driving said circular ring axially over the mouth of said second pipe section sufficiently to radially deform said mouth inwardly, thereby forming an annular groove in said first pipe section and radially pressing said mouth into said groove.

2. Apparatus as defined in claim 1 wherein said means for positioning said first and second semi-circular members adjacent each other comprises:
  (a) a first yoke having a bowl formed in one face thereof for receiving said first semi-circular member;
  (b) a second yoke having a bowl formed in one face thereof for receiving said second semi-circular member; and
  (c) first and second hydraulic cylinders mounted on said first yoke with the piston rods extending normal to the central axes of said bowls, the ends of said piston rods attached to said second yoke and positioning the bowl in said second yoke in register with the bowl in first yoke whereby activation of said hydraulic cylinders alternatively draws said faces of said yokes together to place the ends of said semi-circular members adjacent each other to form a ring and away from each other to separate said semi-circular members.

* * * * *